(12) United States Patent  (10) Patent No.: US 7,040,643 B1
Eliades  (45) Date of Patent: May 9, 2006

(54) TRUCK BED EXTENSION

(76) Inventor: Peter Eliades, 1531 Las Vegas Blvd. South, Las Vegas, NV (US) 89104

( * ) Notice: Subject to any disclaimer, the term of this patent is extended or adjusted under 35 U.S.C. 154(b) by 0 days.

(21) Appl. No.: 11/087,486

(22) Filed: Mar. 23, 2005

(51) Int. Cl.
    *B60P 3/40* (2006.01)
(52) U.S. Cl. .................. 280/401; 280/404; 296/26.09; 296/26.1
(58) Field of Classification Search ............... 280/400, 280/401, 403, 404, 415.1, 489, 498, 491.1, 280/500, 656; 296/165, 170, 174, 26.08, 296/26.09, 26.1, 37
    See application file for complete search history.

(56) References Cited

U.S. PATENT DOCUMENTS

| 1,366,771 | A |   | 1/1921  | Devencenzi |         |
|-----------|---|---|---------|------------|---------|
| 2,328,138 | A |   | 8/1943  | Gosser     |         |
| 2,490,014 | A |   | 12/1949 | Brand      |         |
| 2,549,018 | A |   | 4/1951  | Sarlo      |         |
| 2,788,137 | A | * | 4/1957  | Harkness   | 414/522 |
| 3,613,918 | A | * | 10/1971 | Kruschke   | 414/542 |
| 3,794,192 | A | * | 2/1974  | Monson     | 414/541 |
| 3,877,714 | A |   | 4/1975  | Black      |         |
| 4,475,760 | A |   | 10/1984 | Morgan     |         |
| 4,830,242 | A | * | 5/1989  | Painter    | 224/42.32 |
| 4,951,991 | A |   | 8/1990  | Haigler    |         |
| 4,990,049 | A | * | 2/1991  | Hargrove   | 414/537 |
| 5,281,078 | A | * | 1/1994  | Mills, Jr. | 414/680 |
| 5,356,164 | A | * | 10/1994 | Miller     | 280/79.6 |
| 5,456,511 | A | * | 10/1995 | Webber     | 296/26.09 |
| 5,649,731 | A | * | 7/1997  | Tognetti   | 296/26.09 |
| 6,050,627 | A |   | 4/2000  | Lee        |         |
| 6,623,028 | B1| * | 9/2003  | Johnston   | 280/656 |

* cited by examiner

*Primary Examiner*—Anne Marie Boehler
(74) *Attorney, Agent, or Firm*—Rob L. Phillips; Greenberg Traurig (57) ABSTRACT

A truck bed extension which is concealed beneath a truck when not being used is disclosed. The truck bed extension comprises a frame and two wheel assemblies for permitting the extension to be pulled behind a truck. During non-use, an elongated member of the truck bed extension is received by a guide channel to facilitate positioning the truck bed extension beneath the truck. When the truck bed extension is not being used the wheel assemblies rotate up under the truck wheel wells and attach thereto. A locking mechanism secures the truck bed extension in place during use. Optional removable side walls attach to the truck bed extension and may alternatively be used as ramps for loading wheeled-vehicles. A hoist slidably engaging side walls of the truck bed permits heavy and cumbersome materials to be loaded and unloaded.

13 Claims, 9 Drawing Sheets

TRUCK BED EXTENSION

FIELD OF THE INVENTION

The embodiments of the present invention relate to a truck bed extension. More particularly, the embodiments relate to a truck bed extension concealed beneath a vehicle during non-use and extendable behind the vehicle during use.

BACKGROUND

The use of pick-up trucks for moving materials is not a new one. In fact, the first pick-up trucks were built nearly 90 years ago. Although truck beds have been lengthened over the years to accommodate more materials, they still do not accommodate very long materials such as lumber, rebar and similar materials.

Consequently, there have been numerous attempts to develop truck bed extensions. U.S. Pat. Nos. 1,366,771, 2,328,138, 3,877,714, 4,475,760, 4,951,991 and 6,050,627 disclose such truck bed extensions. However, each of the disclosed truck bed extensions suffers from one or more drawbacks which are discussed in more detail below. In general, the previous truck bed extensions are complex in design, burdensome to manufacture and/or lack required versatility.

Therefore, there continues to be the need for a truck bed extension which overcomes the aforementioned drawbacks.

SUMMARY

Accordingly, a first embodiment of the present invention comprises a truck bed extension which remains concealed during non-use and which is extendable when needed. In one embodiment, the truck bed extension comprises a frame supported, during use, by two wheels at a rear portion thereof. During non-use, a central frame member inserts into a tubular channel attached to an underside of the vehicle so that the frame is positioned underneath the vehicle. The wheels then rotate and are concealed proximated the vehicle's wheel wells. Thus, during non-use the entire frame and wheels are concealed beneath the vehicle.

Optionally, hydraulic, spring or air shocks may be used to stabilize the wheels of the truck bed extension to provide a smooth ride for the truck bed extension and its load.

A rear portion of the frame is suitable for attachment of the vehicle's original rear bumper to further conceal the truck bed extension during non-use. In addition, the rear bumper permits the original look and feel of the truck to remain unchanged.

Other features, variations and embodiments will become evident from the detailed description, drawings and claims set forth below.

DETAILED DESCRIPTION

The detailed description below sets forth one or more embodiments of a truck bed extension which is able to be extended from beneath a truck during use and which resides concealed beneath the truck during use. As the device is mechanical in nature it comprises multiple components and connection means. Although certain components and connection means are specifically disclosed, it should be understood that other undisclosed components and/or connection means may be used without departing from the spirit and scope of the embodiments of the present invention.

Figure 1:
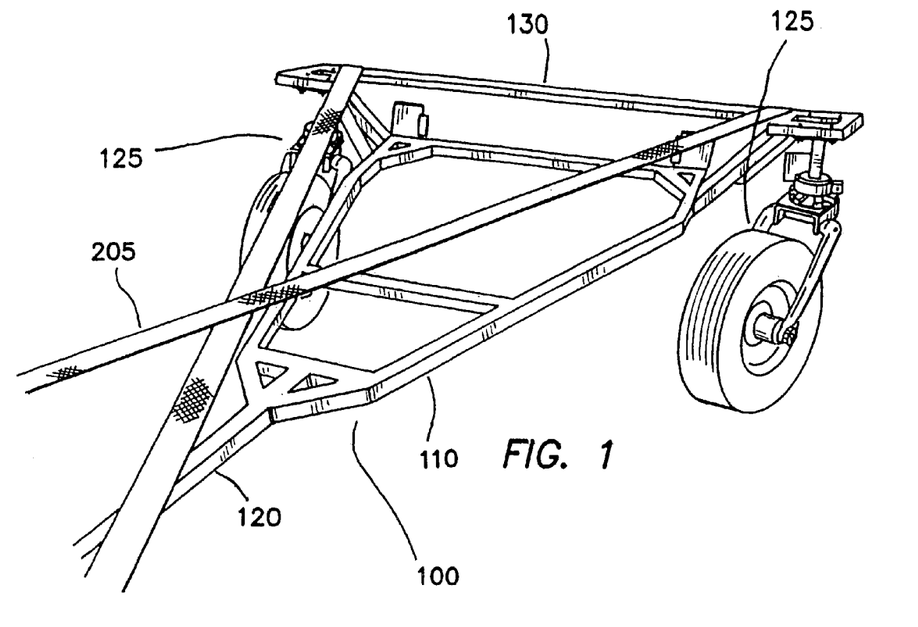
FIG. 1 shows a perspective top view of a first truck bed extension.
Figure 2:
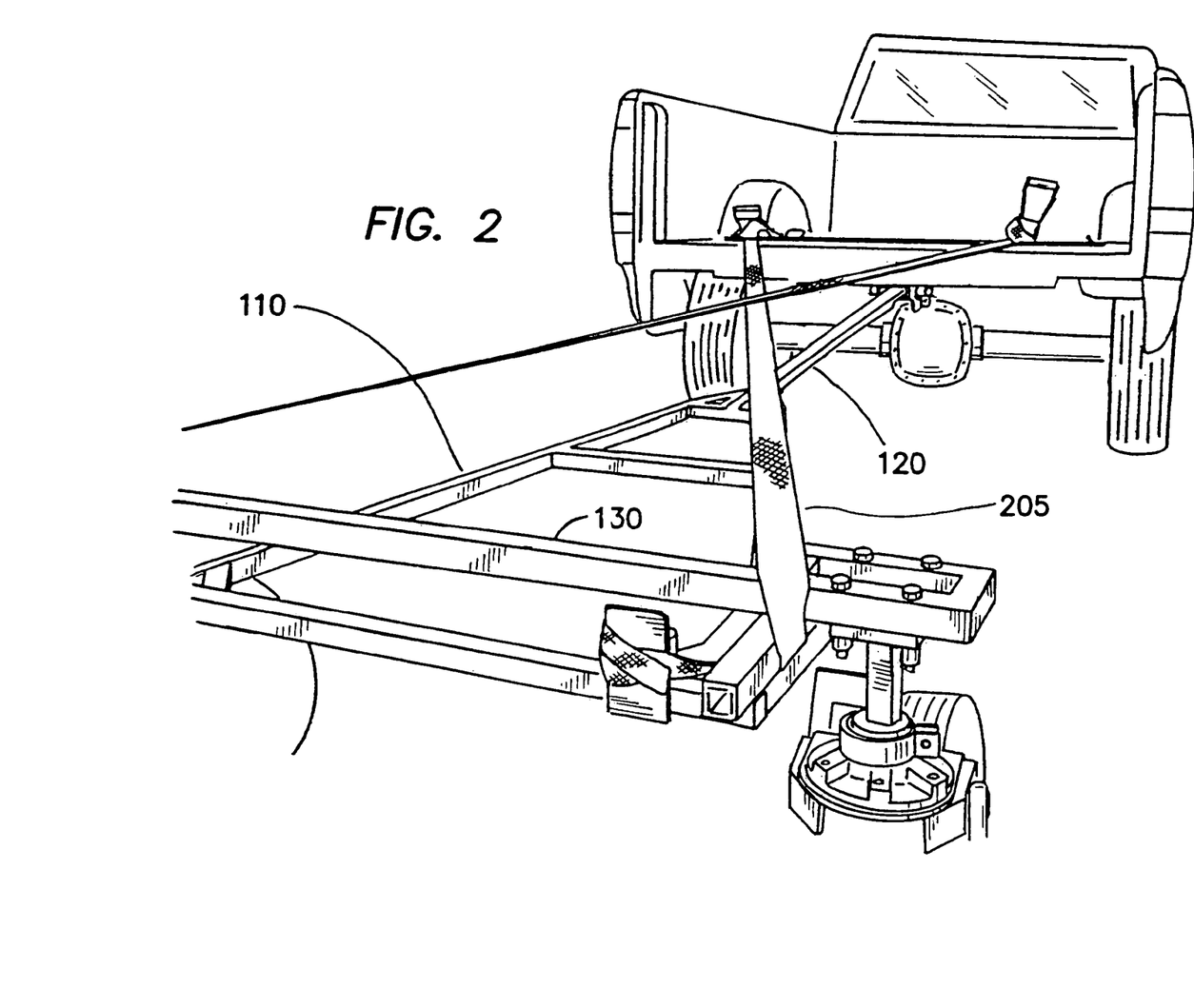
FIG. 2 shows a perspective rear view of the first truck bed extension.

Reference is now made to the figures wherein like parts are referred to by like numerals throughout. FIGS. 1 and 2 show a top and rear view of one embodiment of the truck bed extension generally referred to by reference numeral 100. In general, the truck bed extension comprises an A-shaped frame 110 having elongated extension member 120, two wheel assemblies 125 and horizontal support beam 130. While an A-shaped frame 110 is shown, the frame may take any number of shapes providing the frame fits conveniently beneath the vehicle.

Figure 3:
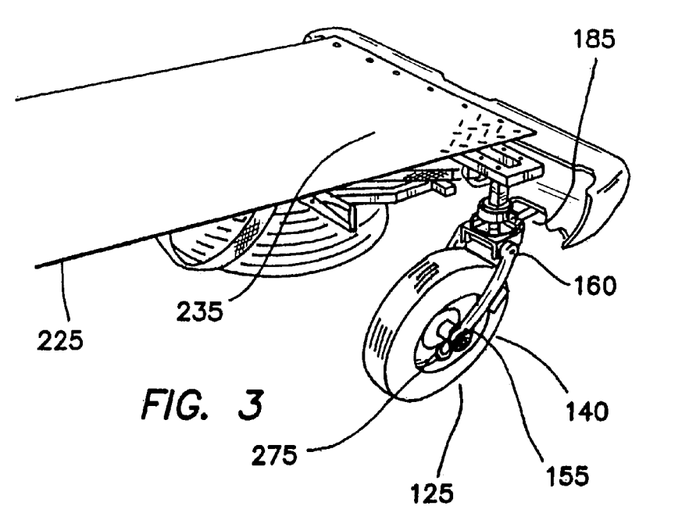
FIG. 3 shows a perspective side view of the first truck bed extension including one wheel assembly, support plate, spare tire and rear bumper.
Figure 4:
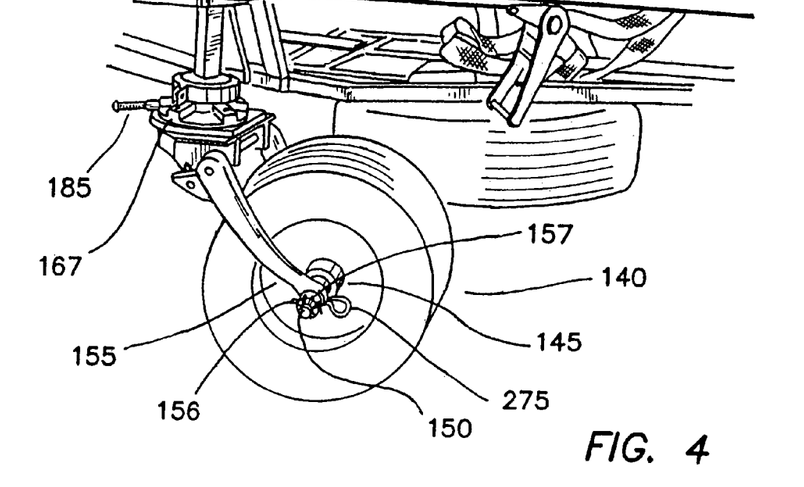
FIG. 4 shows a side view of the first truck bed extension including one wheel assembly, support plate and spare tire.
Figure 5:
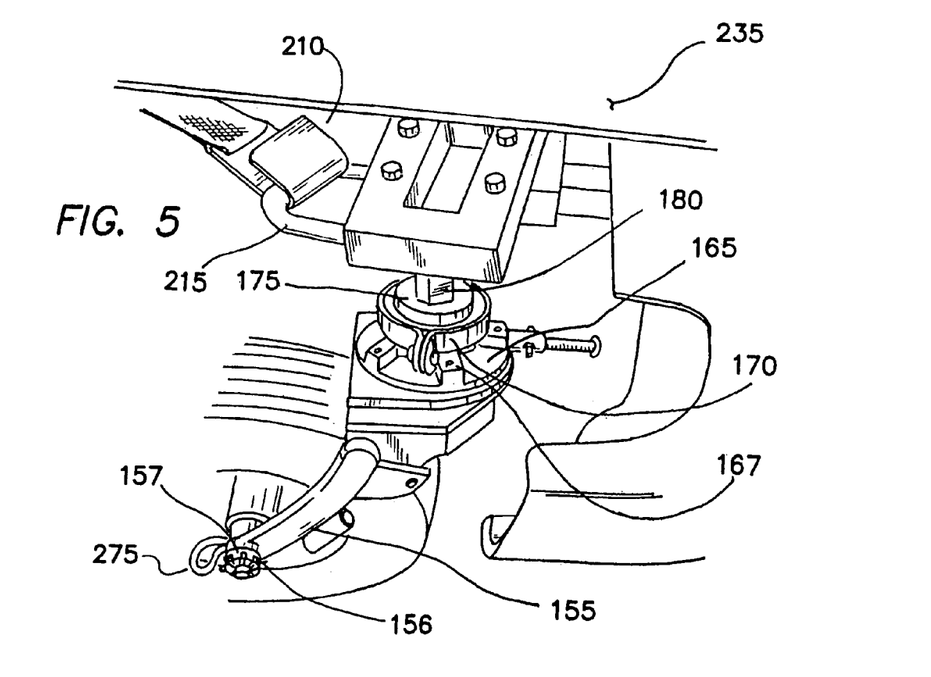
FIG. 5 shows a top view of the first truck bed extension including one wheel assembly.

Now referring to FIGS. 3–5, the wheel assemblies 125 each comprise a tire 140, bushing 145, rod 150, pair of forks 155, fork support unit 160 including connection plate 165, shock collar 170, cover disk 175 and connection post 180. More specifically, first ends of each pair of forks 155 attach on opposite sides of a corresponding tire 140 to the rod 150 which extends through a center point of the tire 140. Each pair of forks 155 is held in place by a pair of cotter pins 156 and a corresponding pair of collars 157. Second ends of the pair of forks 155 are each rotatably attached to the fork support unit 160. As disclosed in more detail below, the forks 155 are rotatable in a vertical plane such that the pair of forks 155 and corresponding tire 140 may be positioned beneath the bed of the truck during non-use.

The fork support units 160 are joined to the connection post 180 in a swivel arrangement. Consequently, during use, the forks 155 and tires 140 are able to swivel in a horizontal plane for maintaining the tires 140 in an optimum position during transport. In other words, the fork support unit 160 is able to shift in a horizontal plane to accommodate for fluctuations in the position of tire 140 during transport. The ability to swivel can be controlled by tightening means in the form of a bolt or screw 185 which tightens or loosens a connection between the connection plates 165 and the fork support units 160. The connection plates 165 and the fork support units 160 are connected via a set of nuts and bolts 167. By tightening or loosening the connection using the screw 185, the friction between the connection plates 165 and fork support units 160 is increased or decreased, respectively. This overall arrangement of vertical displacement and horizontal swivel or rotation allows for a smooth transport of materials regardless of the terrain.

To further increase the stability of the tires 140 during transport, a spring (not shown) housed by shock collar 170 absorbs vertical displacement of the fork support units 160. Each fork support unit 160 vertically displaces along a corresponding connection post 180. Accordingly, a first end of each connection post 180 extends through a central opening of a corresponding shock collar 170, cover disk 175 and connection plate 165. It is conceivable that conventional hydraulic or air shock absorbers may replace or enhance the spring-biased system.

Referring again to FIGS. 1 and 2, a method of using the truck bed extension 100 of the present invention can be visualized. The truck bed extension 100 is ideal for transporting long load or materials such as lumber, piping, carpet and re-bar. In each instance, the materials are laid down with one end in the truck bed 190 and a second end on the truck bed extension 100. Ideally, the materials extend over the horizontal support beam 130 at the rear of the truck bed extension 100. Depending on their length, the first end of the materials may be positioned near a rear portion of the truck bed 190 to allow the materials to extend over the horizontal support beam 130.

Figure 13:
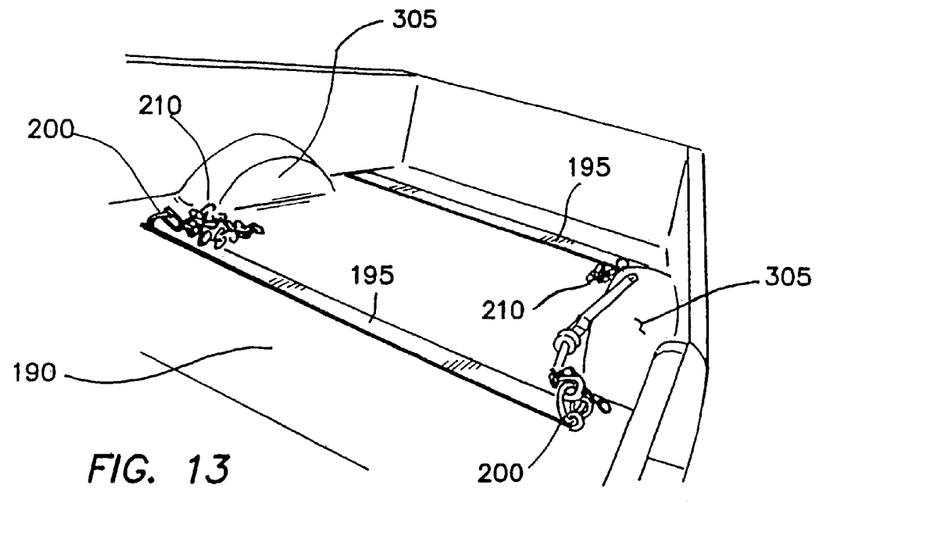
FIG. 13 shows a truck bed having multiple supports for large loads.

As shown in FIGS. 2 and 13, to enhance stability of the materials during transport, brackets 195 are fixed to the truck bed 190. Each end of the brackets 195 includes a rotatable ring 200 attached thereto for securing a cable, chain 210 or similar item. The chains 210 are tightened over the materials using a conventional tightening tool used for such a purpose. In this manner, the chains 210 secure the materials to the truck bed 190. Straps 205 are then used to secure the materials to the truck bed extension 100. The straps 205 are hooked at one end to the brackets 195 and a second end to the truck bed extension 100. Clasping elements 210 at ends of the straps 205 grip the brackets 195 and a handle 215 connected to the horizontal support beam 130. In this manner, the chains 210 secure the materials to the truck bed extension 100.

As shown in FIGS. 3–5 and 10–12, optionally, a flat surface or bed is connected to said frame 110 of the truck bed extension 100. In one embodiment, the bed comprises a heavy plate 225 able to support large loads. Ideally, the plate 225 is removably attached at a first end 235 to a flange 226 of a rigid rod 227 attached to a rear of the truck bed 190. The rigid rod 227 extends between truck bed walls 195 near an opening at a rear of the truck bed 190. The size of the rod 227 should be such that a truck bed gate (not shown) may operate in a conventional fashion. A second end 230 of the plate 225 may be removably attached to a rear portion of the frame 110, namely the support beam 130, or may simply rest thereon. During non-use, the plate 225 may be stored horizontally in the truck bed 190. In this manner, the plate 225 is readily available and also functions like a bed liner.

Another optional feature of the truck bed extension 100 is a pair of temporary side walls (not shown). The side walls attach to outer edges of the plate 225 to create a semi-confined area for materials. Optionally, the side walls may function as ramps to facilitate the loading and unloading of wheeled-vehicles or similar items. When not being used, the temporary side walls, like the plate 225, are stored in the truck bed 190. To facilitate the storage of the side walls, truck wheel wells 305 are modified to incorporate slots (not shown) which receive the side walls. In this arrangement, each slot accepts a side wall during storage such that the side walls are positioned adjacent to the side walls 195 of the truck bed 190.

During non-use, the truck bed extension 100 described herein resides beneath a subject truck and truck bed extension. When required, the truck bed extension 100 is extended from beneath the truck.

Figure 6:
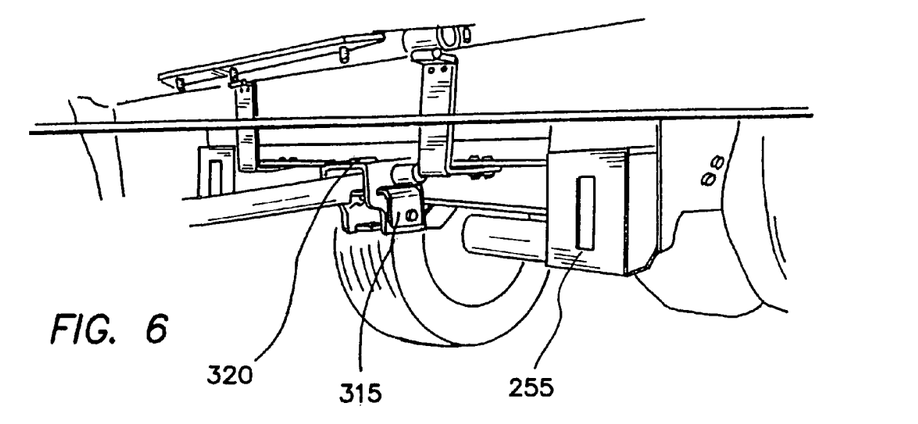
FIG. 6 shows a rear portion of a vehicle wherein the truck bed extension slides beneath the truck.
Figure 7:
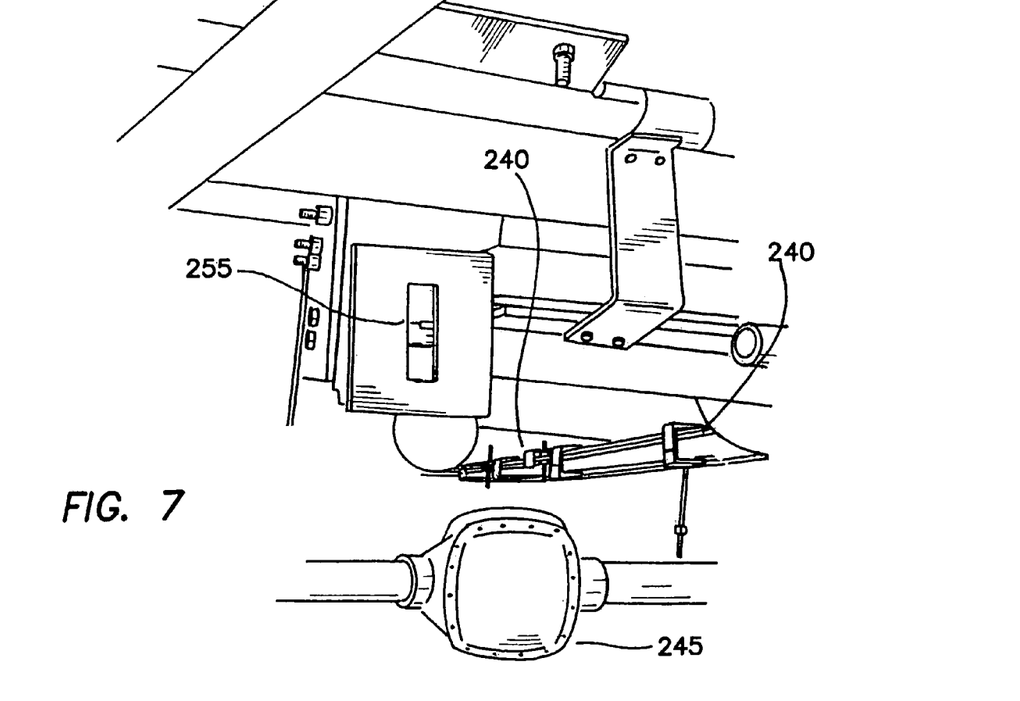
FIG. 7 shows a channel for receiving a central frame member during non-use of the truck bed extension.
Figure 14:
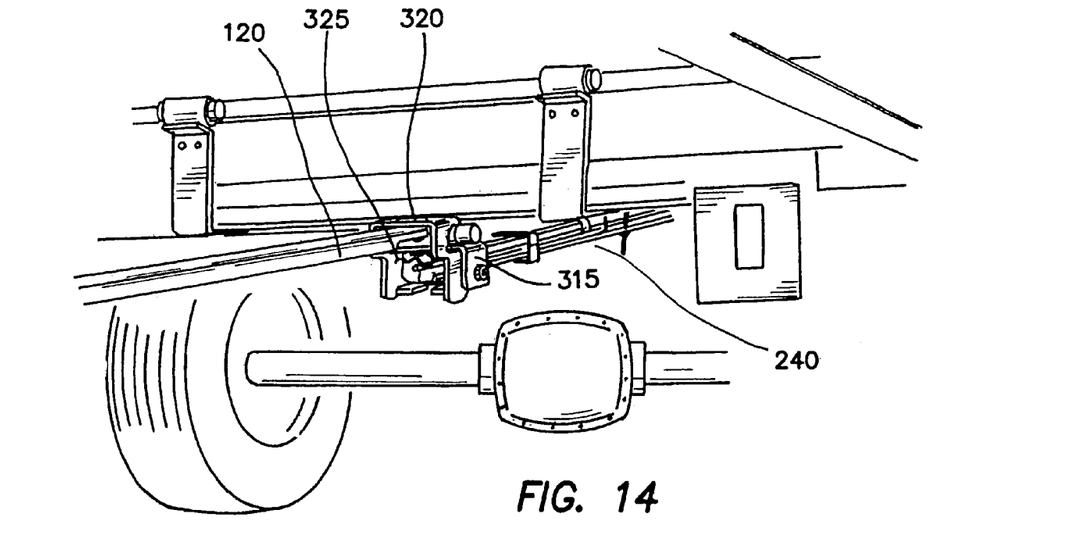
FIG. 14 shows a locking member for maintaining the truck bed extension in an extended position.

A guide channel 240, shown in FIGS. 7 and 14, connected to an underside of the truck retains and accepts elongated extension member 120. During use, the channel 240 retains and holds the extension member 120 in place. When the truck bed extension 100 is required, the guide channel 240 allows the extension member 120 to slide therealong until it reaches a locking position proximate a rear portion of the truck bed 190. As shown in FIGS. 6 and 14, locking the truck bed extension 100 is facilitated by a sliding member 315, peg 320 and cotter pin 325. Once the elongated extension member 120 is pulled from the channel 240, the member 120 is lifted slightly such that the sliding member 315 may be positioned beneath the member 120 to support the member 120. The peg 320 is then placed vertically through an opening in the member 120 and corresponding opening in the sliding member 315 such that the cotter pin 325 may be inserted through a second opening in the peg 320 beneath the sliding member 315. This prevents the extension member 120 from sliding back along or into the guide channel 240 during use. If the extension member 120 were to begin to slide back along the guide channel 240 during use, the truck bed extension 100 would follow thereby potentially causing a load to shift or be lost.

The guide channel 240 is attached to the underside of the truck using any conventional means available including U-shaped brackets, nuts and bolts, welds and rivets. Depending on the make of the truck, the guide channel 240 can pass between an underside of the truck bed 190 and the rear differential housing 245 of the truck. Alternative placement of the guide channel 240 may be used should the proper spacing between the underside of the truck bed 190 and differential housing 245 not be available.

Figure 16:
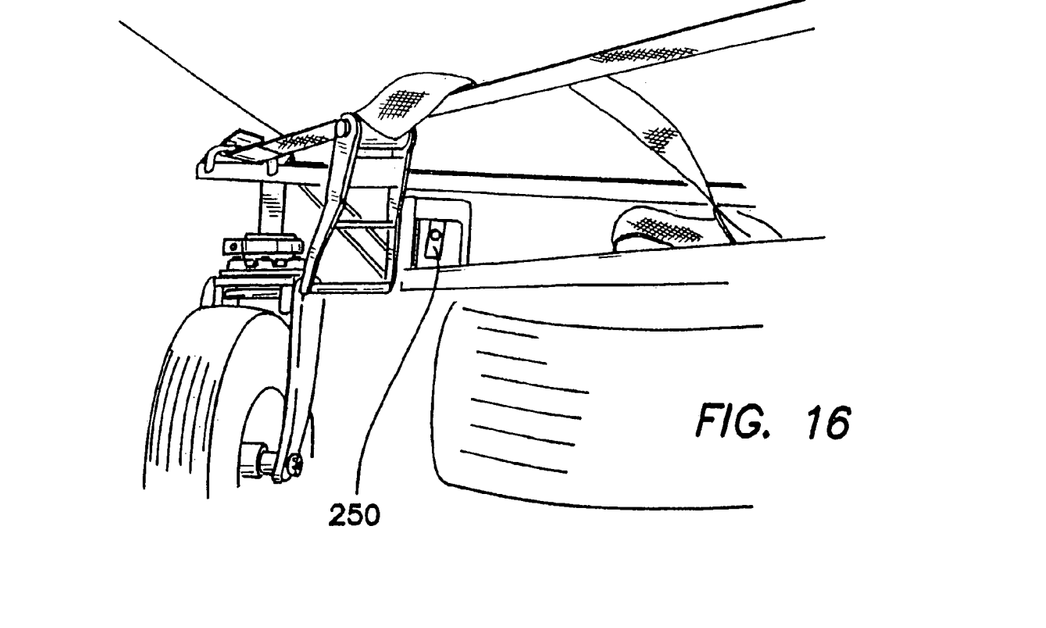
FIG. 16 shows an underneath view of the truck bed extension including a male connector.

Accordingly, during non-use of the truck bed extension 100, the extension member 120 resides within the guide channel 240 and the truck bed extension frame 110 is positioned underneath the truck and truck bed 190. While the guide channel 240 serves to support a percentage of the weight of the truck bed extension 100, additional support means are preferable. Accordingly, a pair of elongated connector units 250 (shown in FIG. 16) proximate a rear of the truck bed extension 100 corresponds to a pair of openings 255 (shown in FIGS. 6 and 7) on the truck. Once the male connector units 250 pass through the openings 255, they rotate 90 degrees to maintain the connection. In this manner, the entire truck chassis and/or truck frame support the truck bed extension 100 during non-use.

Figure 8:
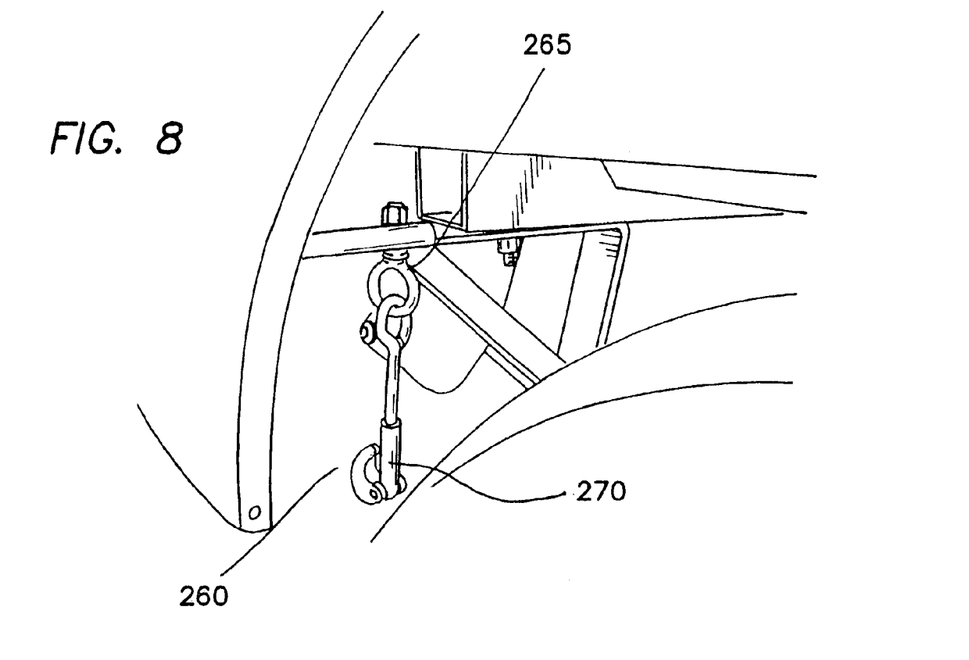
FIG. 8 shows a hooking mechanism for connecting the wheel assemblies to the truck during non-use.
Figure 9:
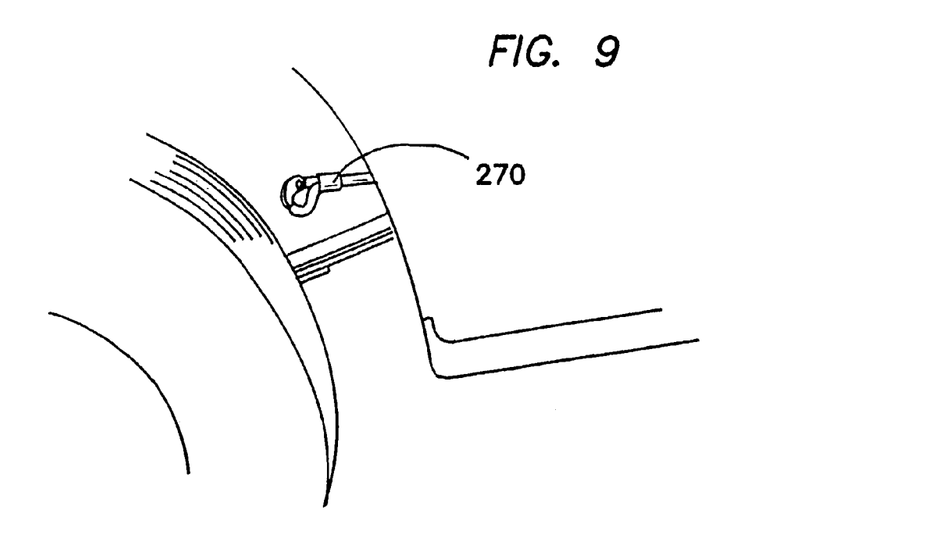
FIG. 9 shows a clip portion of the hooking mechanism.
Figure 10:
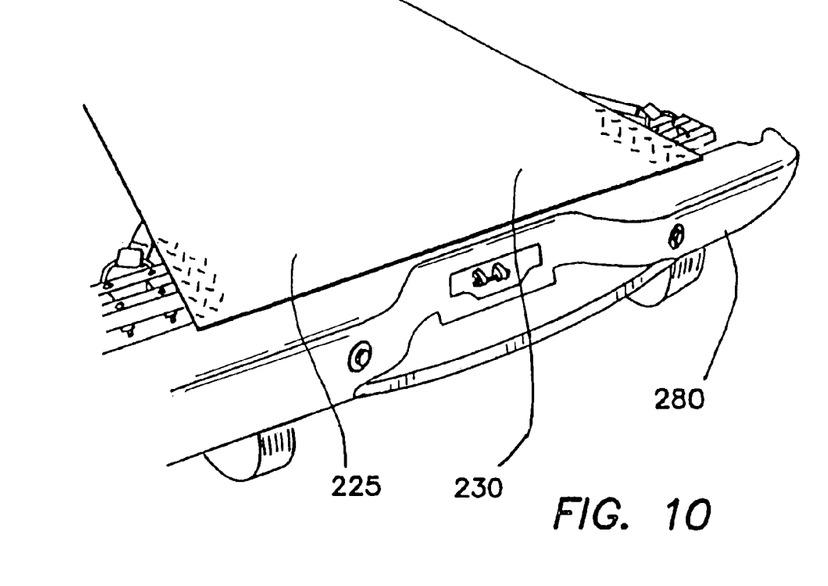
FIG. 10 shows the support plate and rear bumper in place on the truck bed extension.
Figure 11:
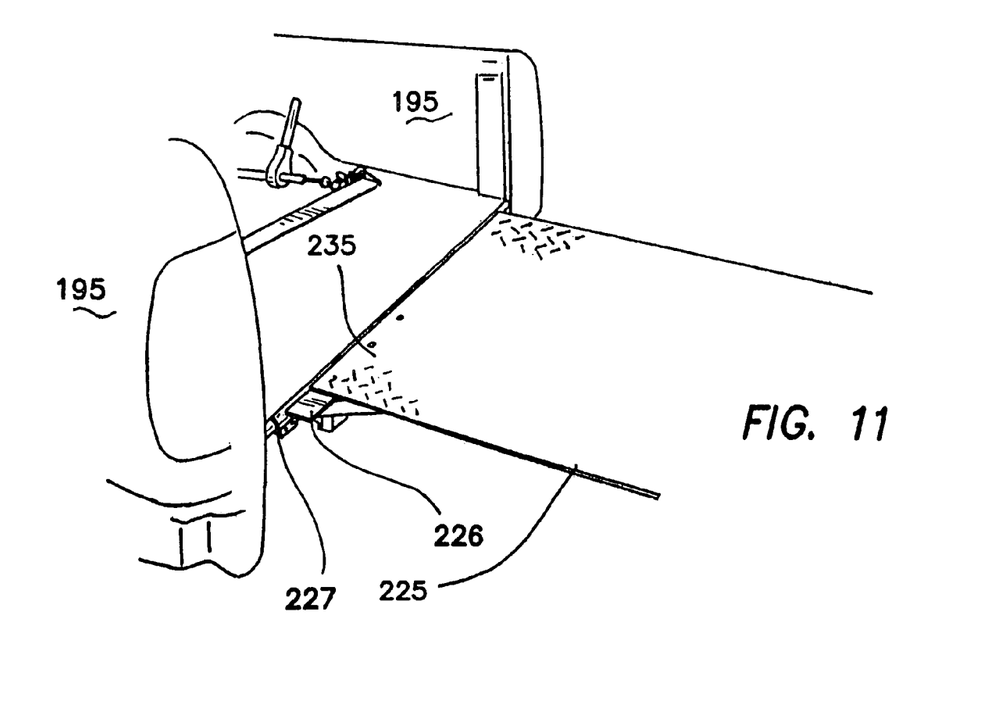
FIG. 11 shows the support plate in reference to the vehicle during use.
Figure 12:
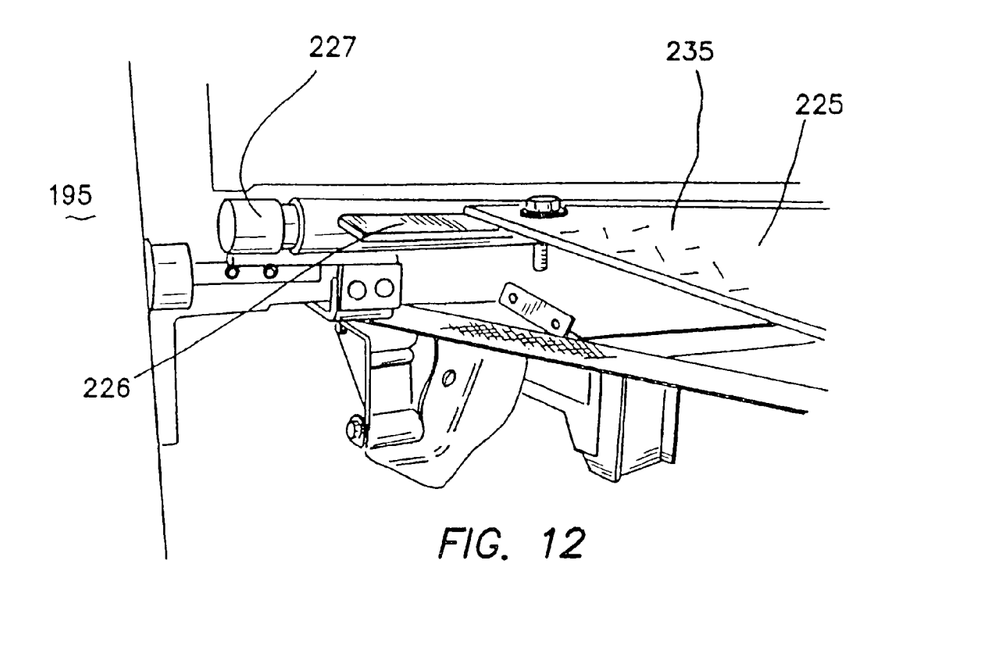
FIG. 12 shows the support plate connection.
Figure 12A:
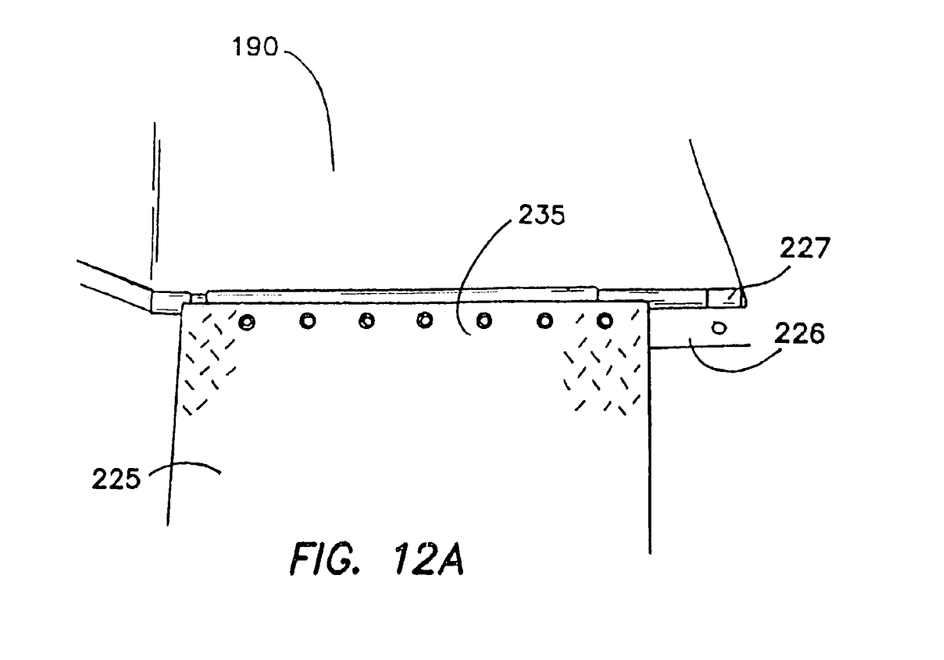
FIG. 12(a) shows a top view of the support plate attached to the vehicle.

Once the truck bed extension 100 has been positioned and secured beneath the truck and truck bed 190, the wheel assemblies 120 are positioned beneath the truck and truck bed 190. The wheel assemblies 120 are rotated in a forward direction (i.e., toward the front of the truck) about the fork support unit 160. Ideally, the wheel assemblies 120 are positioned proximate the opposite wheel wells of the truck. Now referring to FIGS. 8 and 9, a pair of hook systems 260 maintains the wheel assemblies 120 in their position beneath the truck. Each hook system 260 comprises a first eye screw 265 bolted at a first end to the truck and connected at a second end to a releasable hooking device 270. The releasable hooking device 270 captures a corresponding loop or ring 275 on the wheel assembly 120 thereby permitting the hooking device 270 and truck frame to support the weight of the wheel assemblies 120.

To maintain the original appearance of the truck, the truck's original rear bumper 280 is attached to a rear face of the truck bed extension 100. Consequently, when the truck bed extension 100 is positioned beneath the truck, the truck bumper 280 is located in its conventional position.

Figure 15:
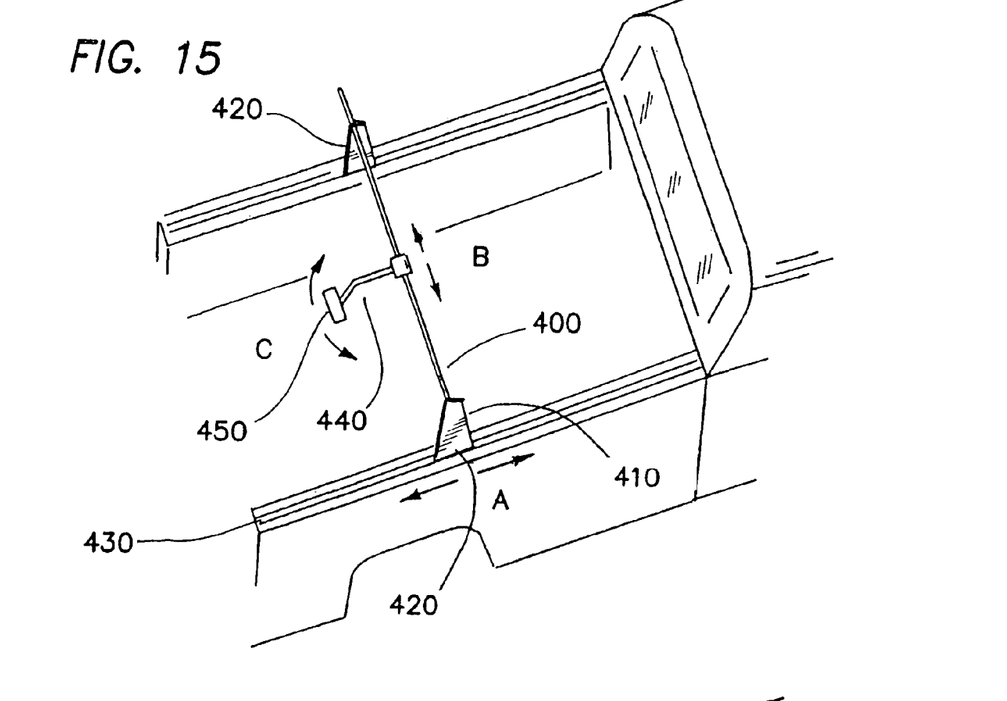
FIG. 15 shows a hoist attached to side walls of a vehicle bed.

As shown in FIG. 15, an optional hoist 400 incorporated on the truck bed 190 facilitates loading and unloading of the truck bed 190 and truck bed extension 100. The hoist 400 generally comprises a frame 410 with opposite ends 420 slidably engaged, and extending longitudinally along, the truck bed side walls 195. More particularly, tracks 430 engage the hoist 400 such that the joist 400 is free to move. Accordingly, the hoist 400 may slide from the truck cab to a rear of the truck bed 100 as identified by arrow A. One or more locking mechanisms permit the hoist 400 to be locked in place along the length of the truck bed 190. Ideally, the hoist frame 400 extends above the height of the truck cab for sufficient clearance. An extendible arm 440 is slidably connected to the hoist 400 and is free to move in a lateral direction as identified by arrow B. The arm 440 may also rotate as identified by arrow C. A second end of the arm 440 supports a manual or automatic winch 450 for lifting materials to be loaded onto the truck bed 190 and/or truck bed extension 100.

Although the invention has been described in detail with reference to several embodiments, additional variations and modifications exist within the scope and spirit of the invention as described and defined in the following claims.

I claim:

1. A truck bed extension comprising:
   a frame including means for supporting a load;
   two wheel assemblies including tires, said wheel assemblies rotatably connected to said frame such that the wheel assemblies provide means for transporting said truck bed extension behind a truck during use and rotate beneath the truck when the truck bed extension is not in use;
   a channel positioned beneath said truck, said channel configured to slidably receive an elongated member of said frame thereby providing for the frame to be concealed beneath the truck when not in use and to be positioned behind the truck during use; and
   clips attached to an underside of the truck for receiving loops attached to each wheel assembly such that the wheels are secured beneath the truck when the truck bed extension is not in use.

2. The truck bed extension of claim 1 wherein a truck bumper is attached to a rear of the truck bed extension.

3. The truck bed extension of claim 1 further comprising a locking mechanism for locking the truck bed extension in a use position.

4. The truck bed extension of claim 3 wherein the locking mechanism comprises a combination of a sliding member, peg and cotter pin such that the sliding member supports one end of the elongated member and the peg and cotter pin secure the elongated member to the sliding member.

5. The truck bed extension of claim 1 further comprising a hoist slidably connected to a bed of the truck.

6. The truck bed extension of claim 1 wherein the means for supporting the load comprises a flat plate.

7. The truck bed extension of claim 1 further comprising removable side walls.

8. A truck bed extension comprising:
   a frame supporting a load surface;
   two wheel assemblies including tires, said wheel assemblies rotatable connected to said frame such that the wheel assemblies provide means for transporting said truck bed extension behind a truck during use and rotate beneath the truck when the truck bed extension is not in use;
   a channel positioned beneath said truck, said channel configured to slidably receive an elongated member of said frame thereby providing for the frame to be concealed beneath the truck when not in use and to be positioned behind the truck during use;
   side walls removably attached to said load surface; and
   clips attached to an underside of the truck for receiving loops attached to each wheel assembly such that the wheels are secured beneath the truck when the truck bed extension is not in use.

9. The truck bed extension of claim 8 wherein a truck bumper is attached to a rear of the truck bed extension.

10. The truck bed extension of claim 8 further comprising a locking mechanism for locking the truck bed extension in a use position.

11. The truck bed extension of claim 10 wherein the locking mechanism comprises a combination of a sliding member, peg and cotter pin such that the sliding member supports one end of the elongated member and the peg and cotter pin secure the elongated member to the sliding member.

12. The truck bed extension of claim 8 further comprising a hoist slidably connected to a bed of the truck.

13. The truck bed extension of claim 8 wherein the side ramps act as ramps when removed from attachment to said load surfaces.

* * * * *